United States Patent
Stauffer et al.

(10) Patent No.: US 12,021,462 B2
(45) Date of Patent: *Jun. 25, 2024

(54) SYSTEMS AND METHODS FOR CONTROLLING AN ELECTRIC MOTOR

(71) Applicant: REGAL BELOIT AMERICA, INC., Beloit, WI (US)

(72) Inventors: Zachary Joseph Stauffer, Fort Wayne, IN (US); Mark Lyon Klopp, Berne, IN (US); David Allen Clendenen, Fort Wayne, IN (US); Ronald William Blotkamp, Garrett, IN (US); Maung Saw Eddison, Fort Wayne, IN (US); Ludovic Andre Chretien, Columbia City, IN (US)

(73) Assignee: Regal Beloit America, Inc., Milwaukee, WI (US)

(*) Notice: Subject to any disclaimer, the term of this patent is extended or adjusted under 35 U.S.C. 154(b) by 437 days.

This patent is subject to a terminal disclaimer.

(21) Appl. No.: 16/902,741

(22) Filed: Jun. 16, 2020

(65) Prior Publication Data
US 2020/0313588 A1 Oct. 1, 2020

Related U.S. Application Data

(63) Continuation of application No. 14/887,467, filed on Oct. 20, 2015, now Pat. No. 10,720,867.

(51) Int. Cl.
*H02P 3/12* (2006.01)
*H02P 1/46* (2006.01)
(Continued)

(52) U.S. Cl.
CPC ............. *H02P 21/14* (2013.01); *H02P 1/46* (2013.01); *H02P 29/60* (2016.02); *H02P 29/62* (2016.02)

(58) Field of Classification Search
CPC ........... H02P 29/005; H02P 21/14; H02P 1/46
(Continued)

(56) References Cited

U.S. PATENT DOCUMENTS

| 4,547,977 A | 10/1985 | Tenedini et al. |
| 5,995,890 A | 11/1999 | Permuy |

(Continued)

FOREIGN PATENT DOCUMENTS

JP 2009027923 A 2/2009

OTHER PUBLICATIONS

Partial European Search Report dated Apr. 11, 2017; EP 16 19 4935; 6 pages.
(Continued)

*Primary Examiner* — Gabriel Agared
(74) *Attorney, Agent, or Firm* — Armstrong Teasdale LLP

(57) ABSTRACT

Methods and systems for controlling an electric motor using a motor controller including a processor are provided. The method includes transmitting, by the processor, a no-spin signal commanding the electric motor not to spin, receiving temperature information associated with a temperature of the electric motor, comparing the temperature information to a predetermined threshold temperature to determine whether the temperature is at a sufficient level to prevent icing, and adjusting current applied to the electric motor when the temperature measurement is below the predetermined threshold.

11 Claims, 8 Drawing Sheets

(51) Int. Cl.
*H02P 3/22* (2006.01)
*H02P 21/14* (2016.01)
*H02P 29/60* (2016.01)
*H02P 29/62* (2016.01)

(58) Field of Classification Search
USPC .................................................. 318/400.21
See application file for complete search history.

(56) References Cited

U.S. PATENT DOCUMENTS

| | | |
|---|---|---|
| 6,713,986 B1 | 3/2004 | Jayadev et al. |
| 6,864,659 B2 | 3/2005 | Ratz et al. |
| 9,543,879 B2 | 1/2017 | Toliyat et al. |
| 9,602,027 B2* | 3/2017 | Sheahan ................. H02P 3/06 |
| 2001/0035018 A1 | 11/2001 | Takagi et al. |
| 2002/0187059 A1 | 12/2002 | Gold et al. |
| 2008/0179973 A1* | 7/2008 | Kreitzer ................. H02K 5/207 |
| | | 310/53 |
| 2013/0152892 A1* | 6/2013 | Hawkins ................. F01M 5/021 |
| | | 903/904 |
| 2013/0320889 A1 | 12/2013 | Zhang et al. |
| 2014/0009099 A1* | 1/2014 | Greetham ................. H02P 1/00 |
| | | 318/558 |
| 2014/0265974 A1* | 9/2014 | Chretien ................. H02P 1/46 |
| | | 318/430 |
| 2014/0312813 A1 | 10/2014 | Murchie et al. |
| 2015/0084568 A1* | 3/2015 | Sheahan ................. H02P 3/02 |
| | | 318/490 |
| 2016/0056622 A1* | 2/2016 | Hamilton ............. H02H 7/0833 |
| | | 318/473 |

OTHER PUBLICATIONS

Extended EP Search Report, dated Feb. 27, 2020, for related EP patent application EP 19213936.8.

* cited by examiner

SYSTEMS AND METHODS FOR CONTROLLING AN ELECTRIC MOTOR

CROSS-REFERENCE TO RELATED APPLICATIONS

This application is a continuation of U.S. patent application Ser. No. 14/887,467, filed Oct. 20, 2015, the entire contents and disclosure of which are hereby incorporated by reference herein.

BACKGROUND

The embodiments described herein relate generally to motors, and more particularly, to systems and methods for controlling an electric motor.

Electric motors are used in a variety of systems operating in a variety of industries. Some such uses of electric motors include evaporator and/or cold-storage applications such as walk-in freezers. Electric motors used in such applications are exposed to freezing temperatures, for example, temperatures as low as −50° C. At such temperatures, a large amount of condensing occurs, including continuous heating and cooling during different phases throughout the day. In some instances, an internal ambient temperature of the electric motor may reach a freezing point and ice may form within the motor's components, resulting in a potential locking environment. Moreover, if any ice formation is defrosted too rapidly, damming and/or flooding may occur and damage the electric motor. In other instances, high winds may create a windmilling effect or reverse rotation of a fan coupled to the electric motor. This reverse rotation may create a load with large inertia that can become large enough to prevent the motor from starting and/or may damage the components of the electric motor.

BRIEF DESCRIPTION

In one aspect, a method of controlling an electric motor using a motor controller including a processor is provided. The method includes transmitting, by the processor, a no-spin signal commanding the electric motor not to spin, receiving temperature information associated with a temperature of the electric motor, comparing the temperature information to a predetermined threshold temperature to determine whether the temperature is at a sufficient level to prevent icing, and adjusting current applied to the electric motor when the temperature measurement is below the predetermined threshold.

In another aspect, a motor controller coupled to an electric motor is provided. The motor controller is configured to: transmit a no-spin signal commanding the electric motor not to spin, receive temperature information associated with a temperature of the electric motor, compare the temperature information to a predetermined threshold temperature to determine whether the temperature is at a sufficient level to prevent icing, and adjust current applied to the electric motor when the temperature information is below the predetermined threshold.

In a further aspect, an electric motor system is provided. The system includes an electric motor and a motor controller coupled to the electric motor. The motor controller is configured to: transmit a no-spin signal commanding the electric motor not to spin, receive temperature information associated with a temperature of the electric motor, compare the temperature information to a predetermined threshold temperature to determine whether the temperature is at a sufficient level to prevent icing, and adjust current applied to the electric motor when the temperature information is below the predetermined threshold.

In yet a further aspect, a motor controller coupled to an electric motor is provided. The motor controller is configured to apply a first amount of current to windings of the electric motor, determine whether the electric motor is operating, and apply a second amount of current to the windings, wherein the second amount of current is larger than the first amount of current.

DETAILED DESCRIPTION

Figure 1:
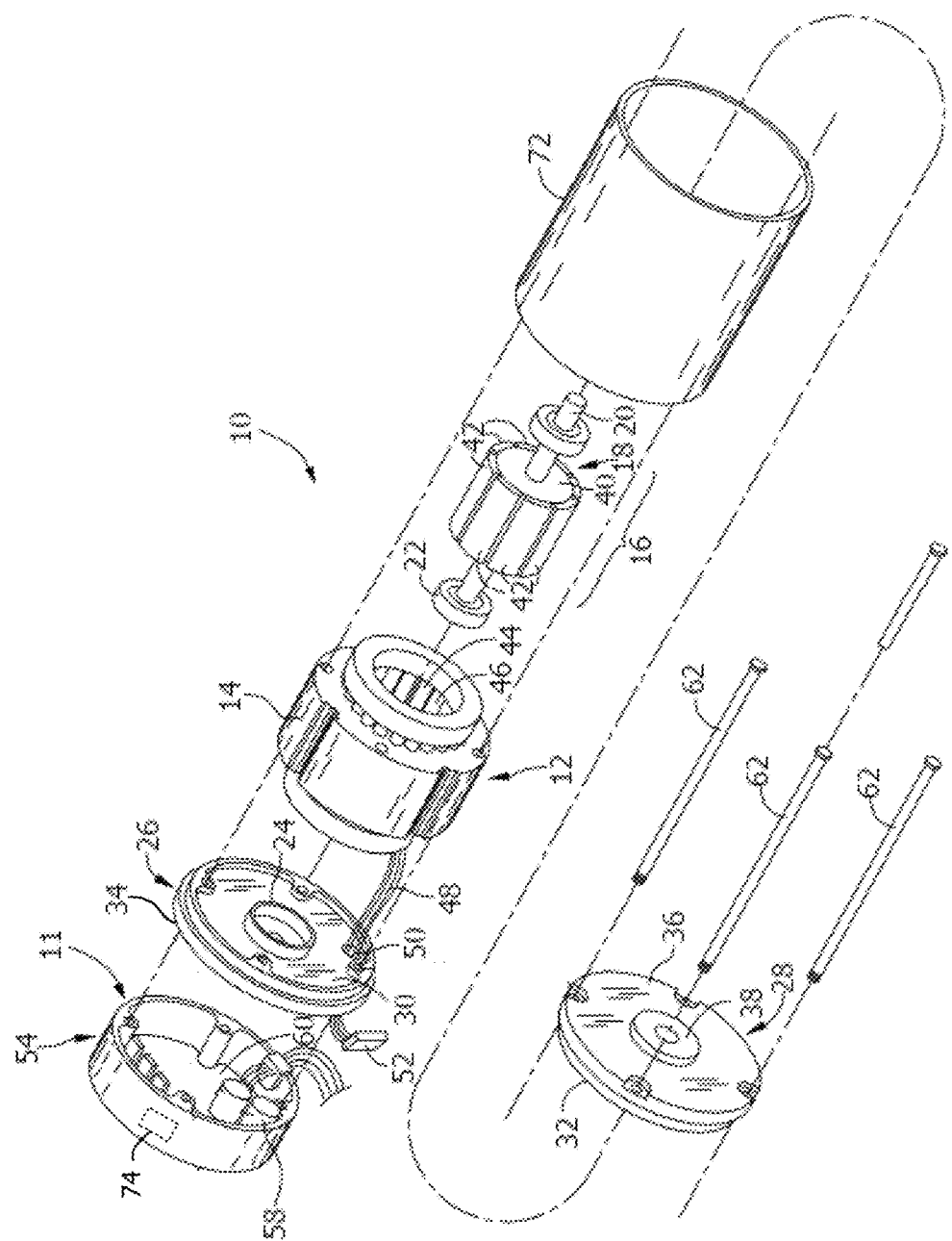
FIG. 1 is an exploded view of an exemplary motor.

FIG. 1 is an exploded view of an exemplary electric motor 10. Motor 10 includes a stationary assembly 12 including a stator or core 14 and a rotatable assembly 16 including a permanent magnet rotor 18 and a shaft 20. In the exemplary embodiment, motor 10 is used in a heating, ventilating and air conditioning system (not shown).

Rotor 18 is mounted on and keyed to shaft 20 for rotation within conventional bearings 22. Bearings 22 are mounted in bearing supports 24 integral with a first end member 26 and a second end member 28. First end member 26 has an inner facing side 30 and an outer side 34. Second end member 28 has an inner facing side 32 and an outer side 36. Outer sides 34 and 36 are opposite inner sides 30 and 32 respectively. Stationary assembly 12 and rotatable assembly 16 are located between sides 30 and 32. Additionally, second end member 28 includes an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number and construction, and flux fields may be utilized with such other rotors within the scope of the invention.

Stationary assembly 12 comprises a plurality of windings 44 adapted to be electrically energized to generate an electromagnetic field. Windings 44 are coils of wire wound around teeth 46 of laminated stator core 14. Winding terminal leads 48 are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention.

Motor 10 may include any even number of rotor poles and the number of stator poles are a multiple of the number of rotor poles. For example, the number of stator poles may be based on the number of phases.

Motor 10 further includes an enclosure 54 which mounts on the rear portion of motor 10. A control system 11 includes a plurality of electronic components 58 and a connector (not shown) mounted on a component board 60, such as a printed circuit board. Control system 11 is connected to winding stages 44 by interconnecting connector 52. Control system 11 applies a current to one or more of winding stages 44 at a time for commutating windings 44 in a preselected sequence to rotate rotatable assembly 16 about an axis of rotation.

A housing 72 is positioned between first end member 26 and second end member 28 to facilitate enclosing and protecting stationary assembly 12 and rotatable assembly 16.

In one embodiment, at least one temperature sensor 74 is coupled to motor 10 and is in communication with control system 11. Temperature sensor 74 is configured to measure a temperature of the environment in which it is positioned and to transmit a signal to control system 11 indicative of the measured temperature.

Figure 2:
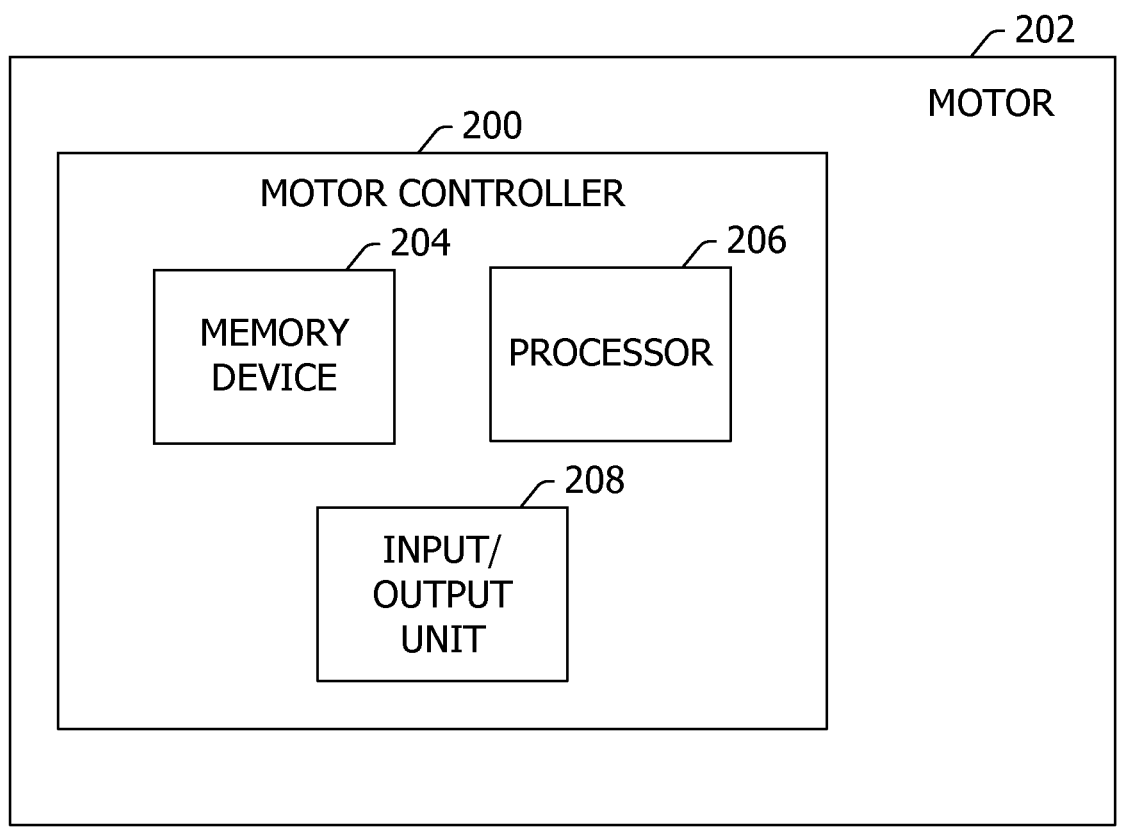
FIG. 2 is a schematic diagram of an exemplary motor controller for use with the motor shown in FIG. 1.

FIG. 2 is a schematic diagram of an exemplary motor controller 200 for use with a motor 202, such as motor 10 (shown in FIG. 1). In the exemplary embodiment, motor controller 200 is an integrated component of motor 202, such as control system 11. Alternatively, motor controller 200 may be communicatively coupled to motor 202 such that motor controller 200 is not integrated into motor 202. In one embodiment, motor controller 200 may control any number of motors as described herein. In the exemplary embodiment, motor 202 is utilized as a fan and/or blower motor in a fluid (e.g., water, air, etc.) moving system in freezing temperatures, for example, as low at −50° C. Alternatively, motor 202 may be implemented in any application that enables electric motor controller 200 to function as described herein, including, but not limited to, a clean room filtering system, a fan filter unit, a variable air volume system, a refrigeration system, a furnace system, an air conditioning system, and/or a residential or commercial heating, ventilation, and air conditioning (HVAC) system.

Motor controller 200 controls motor 202 by transmitting a command signal to components of motor 202. In the exemplary embodiment, the command signal is one or more high-voltage and high frequency pulses. Motor controller 200 includes at least one memory device 204 and a processor 206 that is communicatively coupled to memory device 204 for executing instructions. In one embodiment, memory device 204 and processor 206 are integrated into a single unit. In some embodiments, executable instructions are stored in memory device 204. In the exemplary embodiment, motor controller 200 performs one or more operations described herein by programming processor 206. For example, processor 206 may be programmed by encoding an operation as one or more executable instructions and by providing the executable instructions in memory device 204. Motor controller 200 also includes an input/output unit 208 that enables input and output of data with other components within motor 202 and/or devices that may be connected to motor controller 200. In one embodiment, input/output unit 208 may provide a connection that enables user input to be transmitted and/or received through a user input device (not shown).

In the exemplary embodiment, memory device 204 is one or more devices that enable information such as executable instructions and/or other data to be stored and retrieved. Memory device 204 may include one or more computer readable media, such as, without limitation, dynamic random access memory (DRAM), static random access memory (SRAM), a solid state disk, and/or a hard disk. Memory device 204 may be configured to store, without limitation, application source code, application object code, source code portions of interest, object code portions of interest, configuration data, execution events and/or any other type of data. In the exemplary embodiment, memory device 204 includes firmware and/or initial configuration data for motor controller 200.

Processor 206 may include one or more processing units (e.g., in a multi-core configuration). Further, processor 206 may be implemented using one or more heterogeneous processor systems in which a main processor is present with secondary processors on a single chip. Alternatively, processor 206 may be a symmetric multi-processor system containing multiple processors of the same type. Further, processor 206 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 206 controls operation of motor controller 200.

Figure 3:
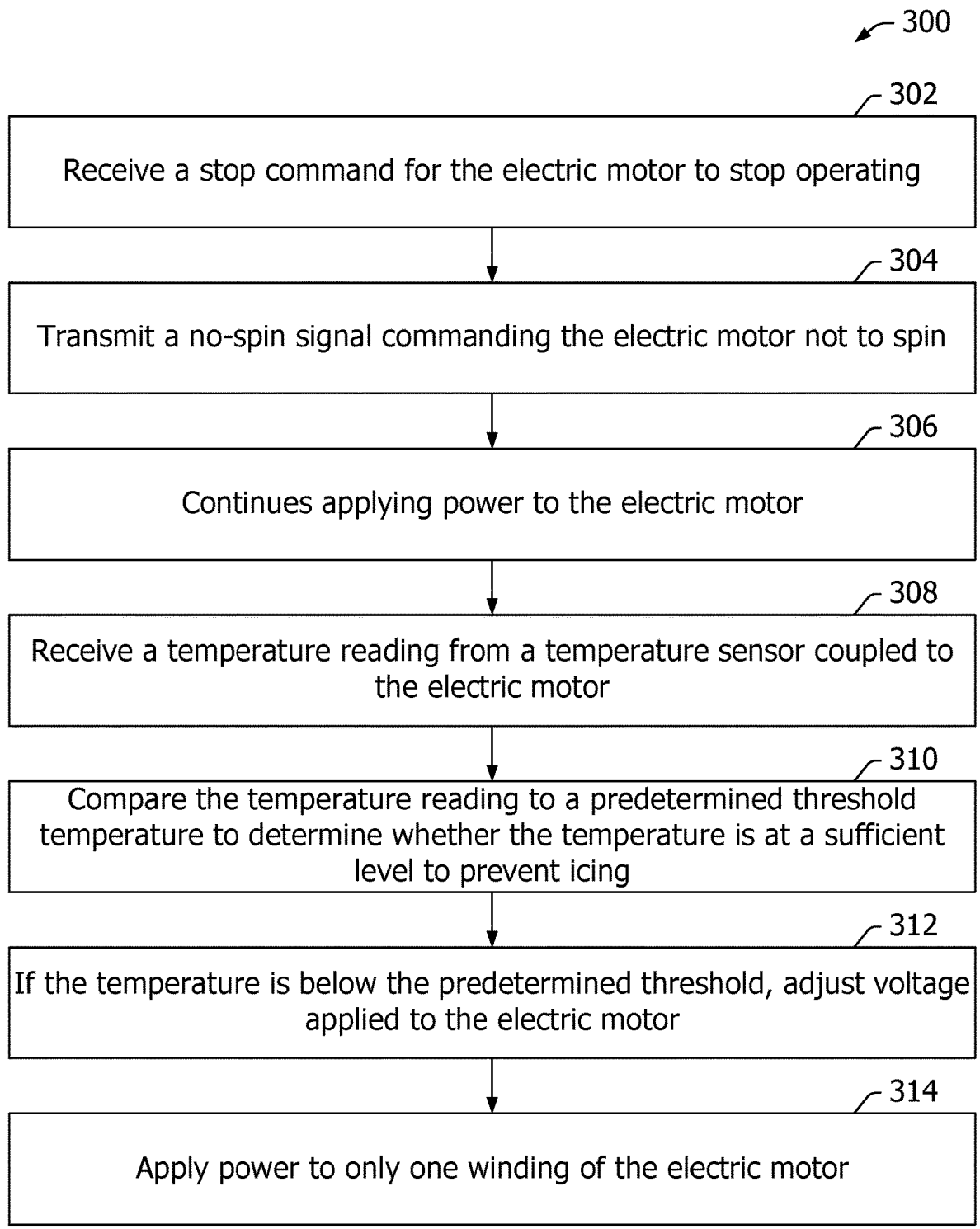
FIG. 3 is a flowchart of an exemplary method of controlling the electric motor shown in FIG. 2.

FIG. 3 is a flowchart of an exemplary method 300 of controlling electric motor 202 (shown in FIG. 2). In the exemplary embodiment, motor 202 and/or controller 200 receives 302 a stop command for electric motor 202 to stop operating. In one embodiment, the stop command is received from a controller of an evaporator unit (not shown). Alternatively, the start command may be sent from any system and/or location that facilitates stopping an electric motor as described herein. Generally, in cold-storage applications, evaporator units will stop electric motor 202 between 1 and 6 times per day to perform cycles through a condenser. A large amount of condensation occurs during the cycling and when the ambient temperature is very cold (i.e., below freezing), ice formation may occur while electric motor 202 is stopped.

In the exemplary embodiment, after receiving 302 the stop command, motor controller 200 transmits 304 a no-spin signal commanding electric motor 202 not to spin. During the no-spin condition signal, motor controller 200 continues applying 306 current to motor 202. In the exemplary embodiment, motor controller 200 receives 308 a temperature reading from a temperature sensor coupled to motor 202, for example, temperature sensor 74 (shown in FIG. 1). In one embodiment, temperature sensor 74 is a thermistor onboard motor 202 (i.e., in a power module or external device). The temperature is inferred by monitoring the resistance of the thermistor. In another embodiment, temperature sensor 74 is an internal temperature sensor of motor controller 200. In an alternative embodiment, one or more temperature sensors 74 are coupled to motor 202 inside and/or outside of housing 72 (shown in FIG. 1). Alternatively, the temperature may be inferred by estimating an impedance of stator 14.

In the exemplary embodiment, motor controller 200 compares 310 the temperature reading to a predetermined threshold temperature to determine whether the temperature is at a sufficient level to prevent icing. If the temperature is above the predetermined threshold, motor controller 200 takes no action. If the temperature is below the predetermined threshold, motor controller 200 adjusts 312 current applied to motor 202. More specifically, motor controller 200 increases the voltage to cause increased current to flow through motor windings 44 (shown in FIG. 1), creating heat in motor 202. The voltage may be either an AC voltage or a DC voltage. Creating heat in motor 202 makes it harder for ice to form on both inside and outside of motor 202. The heat further causes an internal ambient temperature of the components housed within motor 202 to remain at a higher ambient temperature than the outside environment.

In the exemplary embodiment, because the no-spin signal causes motor 202 to not spin, motor controller 200 applies 314 current to only one winding 44 of motor 202. More specifically, motor controller 200 applies an amount of current to winding 44 based on the environment in which motor 202 is operating. For example, if motor 202 is going to be used in an environment where temperature is around −60° C., a sufficient amount of power should be applied to maintain motor 202 at −50° C. Given the amount of space available in motor 202, it may be necessary to apply an amount of current corresponding to a higher temperature (i.e., −20° C.) to maintain the temperature of motor 202 at −50° C.

In the exemplary embodiment, to adjust 312 current applied to motor 202, motor controller 200 determines an amplitude of the current output to motor 202 based on a minimum external ambient temperature needed to be overcome, a target internal ambient temperature, and/or a unit size of motor 202. Bearing ratings and electronics ratings of motor 202 have known, limited values, so by keeping motor 202 above the predetermined temperature, exceeding the bearing and/or electronics ratings does not become an issue. Temperature limits of grease and bearings will not be exceeded, and in general, motor 202 will not lock up across mechanical air gaps.

Figure 4:
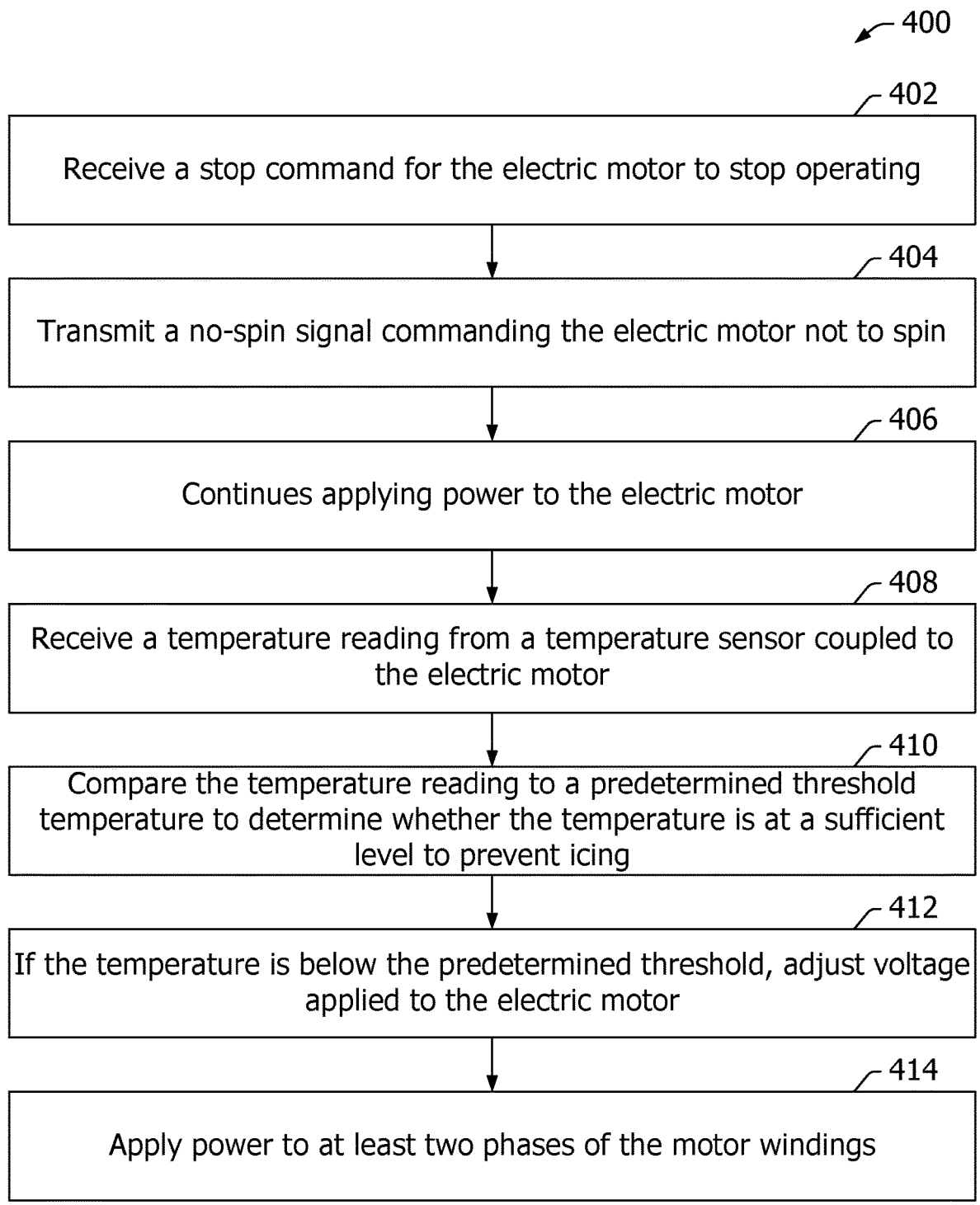
FIG. 4 is a flowchart of an exemplary method of controlling the electric motor shown in FIG. 2.

FIG. 4 is a flowchart of an exemplary method 400 of controlling electric motor 202 (shown in FIG. 2). In the exemplary embodiment, method 400 is similar to method 300 (shown in FIG. 3), except that method 400 applies current to at least two phases of the windings of motor 202 to slightly move or twitch motor 202, while method 300 applies voltage to only 1 phase of motor windings 44. That is, in the exemplary embodiment, motor 202 and/or controller 200 receives 402 a stop command for motor 202 to stop operating.

In the exemplary embodiment, after receiving 402 the stop command, motor controller 200 transmits 404 a no-spin signal commanding electric motor 202 not to spin. During the stop command, motor controller 200 continues applying 406 current to motor 202. In the exemplary embodiment, motor controller 200 receives 408 a temperature reading from a temperature sensor coupled to motor 202, for example, temperature sensor 74 (shown in FIG. 1). In one embodiment, temperature sensor 74 is coupled to motor controller 200. In an alternative embodiment, one or more temperature sensors 74 are coupled to motor 202 inside and/or outside of housing 72 (shown in FIG. 1). Alternatively, the temperature may be estimated using a resistance of stator 14 rather than using temperature sensor 74.

In the exemplary embodiment, motor controller 200 compares 410 the temperature reading to a preset threshold temperature to determine whether the temperature is at a sufficient level to prevent icing. If the temperature is above the predetermined threshold, motor controller 200 takes no action. If the temperature is below the predetermined threshold, motor controller 200 adjusts 412 current applied to motor 202. More specifically, motor controller 200 increases the voltage to cause increased current to flow through the motor windings, creating heat in motor 202. The voltage may be either an AC voltage or a DC voltage. Creating heat in motor 202 makes it harder for ice to form on both the inside and the outside of motor 202. The heat further causes the internal ambient temperature of the components housed within motor 202 to remain at a higher ambient temperature than the outside environment.

In the exemplary embodiment, motor controller 200 applies 414 current to at least two phases of the motor windings, causing motor 202 to twitch (i.e., $1/120^{th}$ of 360 degrees every few seconds). By applying current to at least two phases of the motor windings, the energized phases periodically transition in order to slightly rotate the motor rotor assembly to prevent ice formation. A twitch frequency is adjustable for the specific application. Motor controller 200 determines the twitch frequency based on a minimum temperature, a condensation/humidity level, and/or a unit size of motor 202. Motor controller 200 may change the twitch frequency based on a lookup table associated with the specific application or motor controller 200 may cycle through a predetermined range of twitch frequencies until the proper frequency for preventing ice formation is found. Applying current to two or more windings to twitch motor 202 may be desirable when there are smaller gaps between the mechanical parts. When a small amount of movement is introduced, it becomes harder for ice to form across those gaps.

Figure 5:
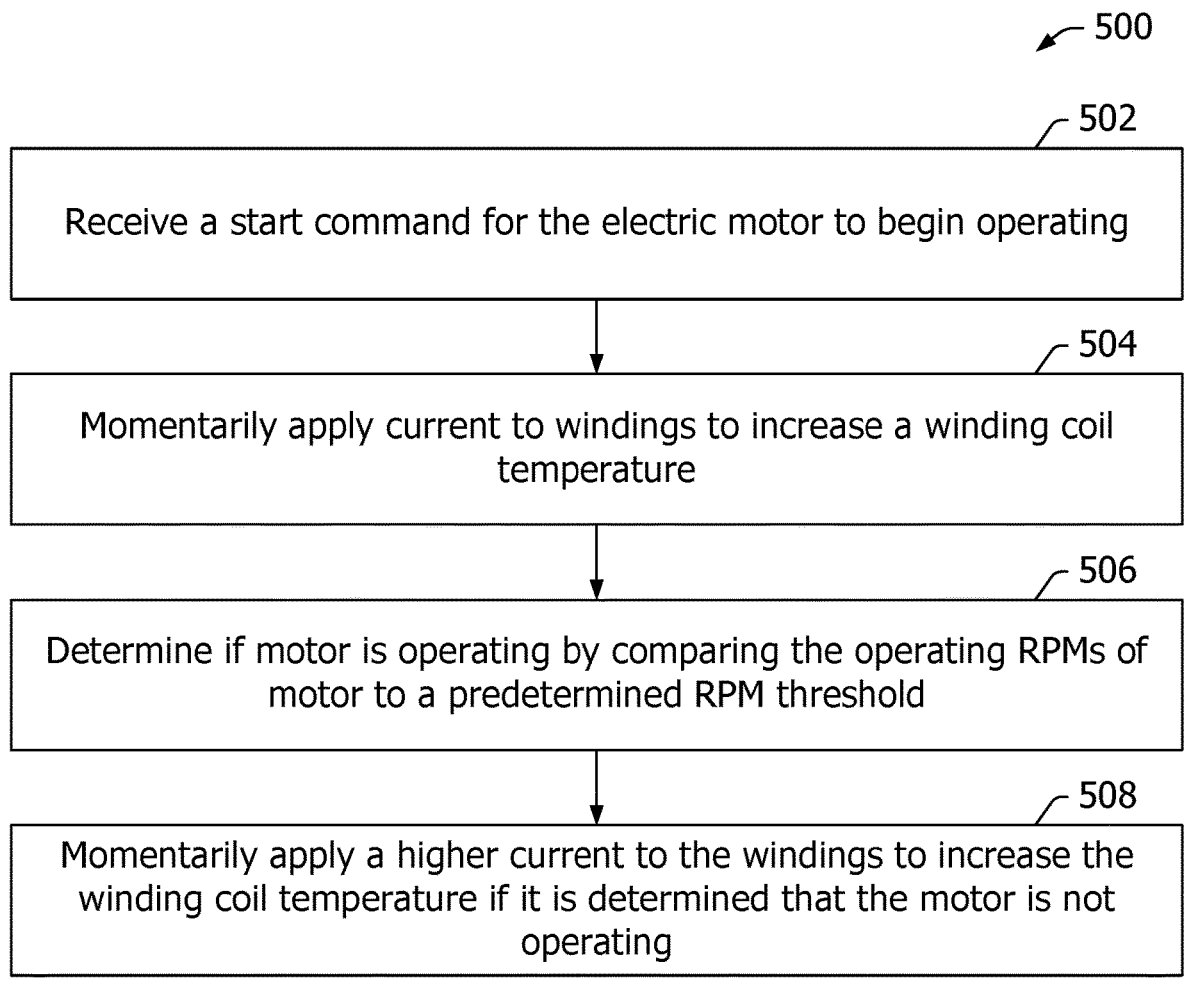
FIG. 5 is a flowchart of an exemplary method of starting the electric motor shown in FIG. 2.

FIG. 5 is flowchart of an exemplary method 500 of starting electric motor 202 (shown in FIG. 2). In the exemplary embodiment, method 500 is implemented on motor 202 after an ice buildup has occurred. Motor 202 and/or motor controller 200 receives 502 a start command for motor 202 to begin operating. In one embodiment, the start command is received from a controller of an evaporator unit (not shown). Alternatively, the start command may be sent from any system and/or location that facilitates starting an electric motor as described herein.

In the exemplary embodiment, after receiving 502 the start command, controller 200 momentarily applies 504 current to windings 44 (shown in FIG. 1) to increase a winding coil temperature. In one embodiment, controller 200 waits a predetermined amount of time after applying 504 the current. The predetermined amount of time can be any amount of time that facilitates starting a motor as described herein, including but not limited to 5-30 seconds. In one embodiment, controller 200 determines 506 if motor 202 is operating by comparing measured operating RPMs of motor 202 to a predetermined RPM threshold. Motor controller 200 is configured to determine that electric motor 202 is operating when the measured RPM of the electric motor exceed the predetermined RPM threshold.

If controller 200 determines that motor 202 is operating, controller 200 operates motor 202 in a normal run mode. If controller 200 determines that motor 202 is not operating, controller 200 momentarily applies 508 a higher current to windings 44 (shown in FIG. 1) to increase the winding coil temperature. The steps of applying current to windings 44 and determining if motor 202 is operating are repeated until the ice buildup is melted and motor 202 is operational.

Figure 6:
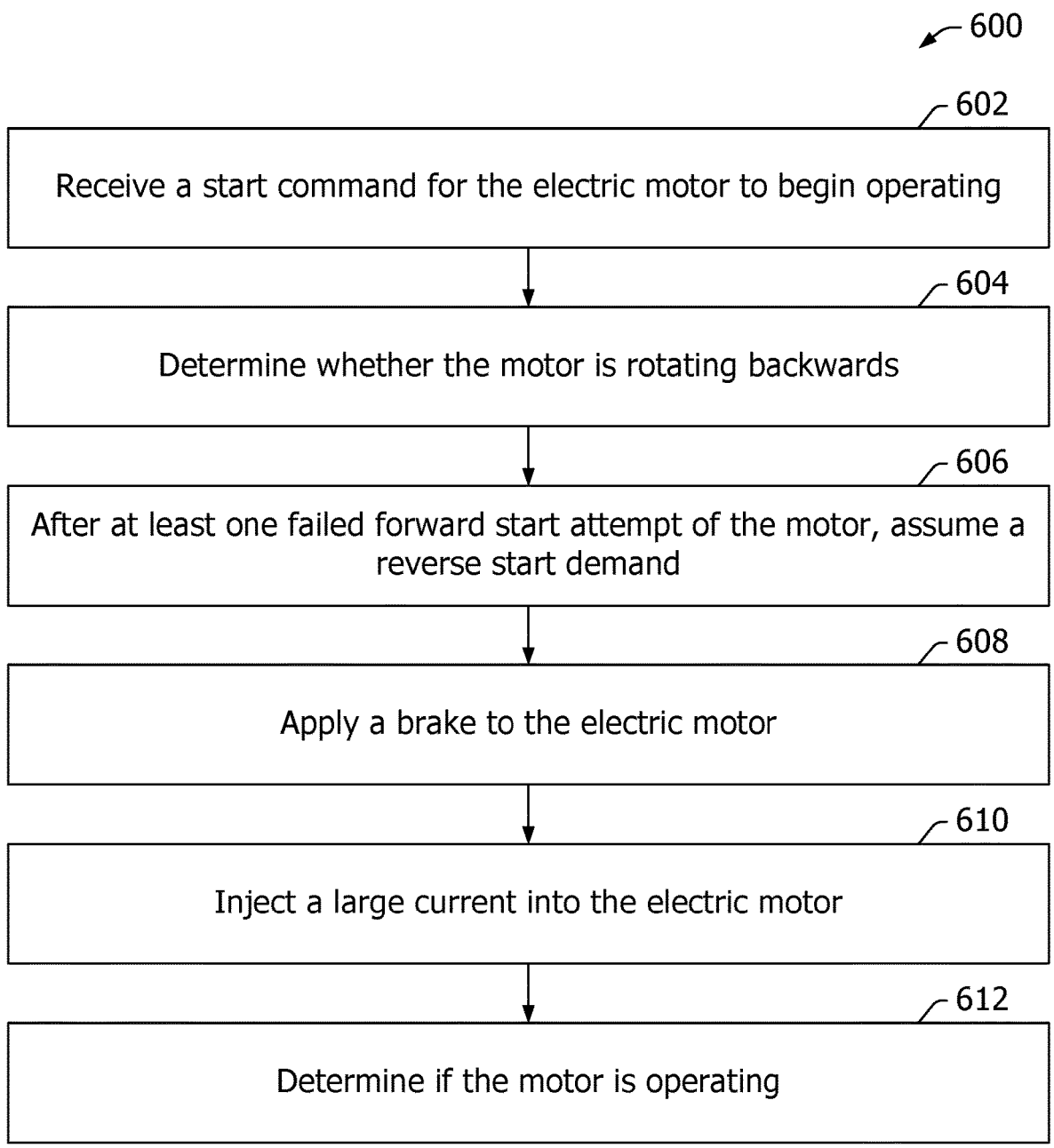
FIG. 6 is a flowchart of an exemplary method of starting the electric motor shown in FIG. 2.

FIG. 6 is a flowchart of an exemplary method 600 of starting electric motor 202 (shown in FIG. 2). Out on rooftops, sometimes a fan coupled to motor 202 is blown and rotates in an opposite direction of the desired direction. When the unit is called to start-up, there is so much torque spinning in the opposite direction that motor 202 struggles to start. Method 600 overcomes reverse spinning by using a brake to stop the fan and then injecting a much higher amount of current than for a normal start. Motor electronics are typically started with a minimum amount of current to try to extend the life of the product, but the minimum current is not nearly enough to stop backwards windmilling.

In the exemplary embodiment, motor 202 and/or motor controller 200 receives 602 a start command for motor 202 to begin operating. In one embodiment, the start command is received from a controller of an evaporator unit (not shown). Alternatively, the start command may be sent from any system and/or location that facilitates starting an electric motor as described herein. In the exemplary embodiment, after receiving 602 the start command, controller 200 determines 604 if motor 202 is rotating backwards using known techniques. More specifically, in the exemplary embodiment, controller 200 initiates a normal start routine by injecting a low current into windings 44 (shown in FIG. 1). After at least one failed forward start attempt of motor 202, motor controller 200 assumes 604 a reverse start command to help overcome unknown rotor position and rotor rotation direction during a low speed wind mill condition.

When reverse rotation is determined 604, controller 200 applies and/or initiates 606 a reverse rotation start routine. The reverse rotation start routine includes applying 608 a brake to motor 202 and injecting 610 a large current into motor 202. In this embodiment, braking 608 is achieved by controller 200 short circuiting windings (e.g. winding stages 44 shown in FIG. 1). In another embodiment, braking 608 is achieved by controller 200 modulating a braking torque.

In one embodiment, the reverse rotation start routine brakes motor 202, and injects 610 a much larger current into motor 202 than for normal starting to increase the torque of the normal start routine by a predetermined amount or percentage. The amount of current injected is set to a maximum amount based on the electronic limits of the power module in motor 202. Alternately, the amount of current may be increased for each attempt to brake motor 202, which would be easier on the electronics and harder on the equipment that includes the motor. In another embodiment, the reverse rotation start routine utilizes a last known start routine, brakes the motor, and increases the torque for that start routine by a predetermined amount or percentage. In yet another embodiment, the reverse rotation start routine brakes rotation of the motor and applies and/or initiates the normal start routine.

In the exemplary embodiment, after the reverse rotation start routine is initiated 606, controller 200 determines 612 if motor 202 is operating. If motor 202 is determined to be operating, motor controller 200 operates motor 202 in a normal operating mode. If motor 202 is determined not to be operating, the process loop continues until operation of motor 202 is determined.

Figure 7:
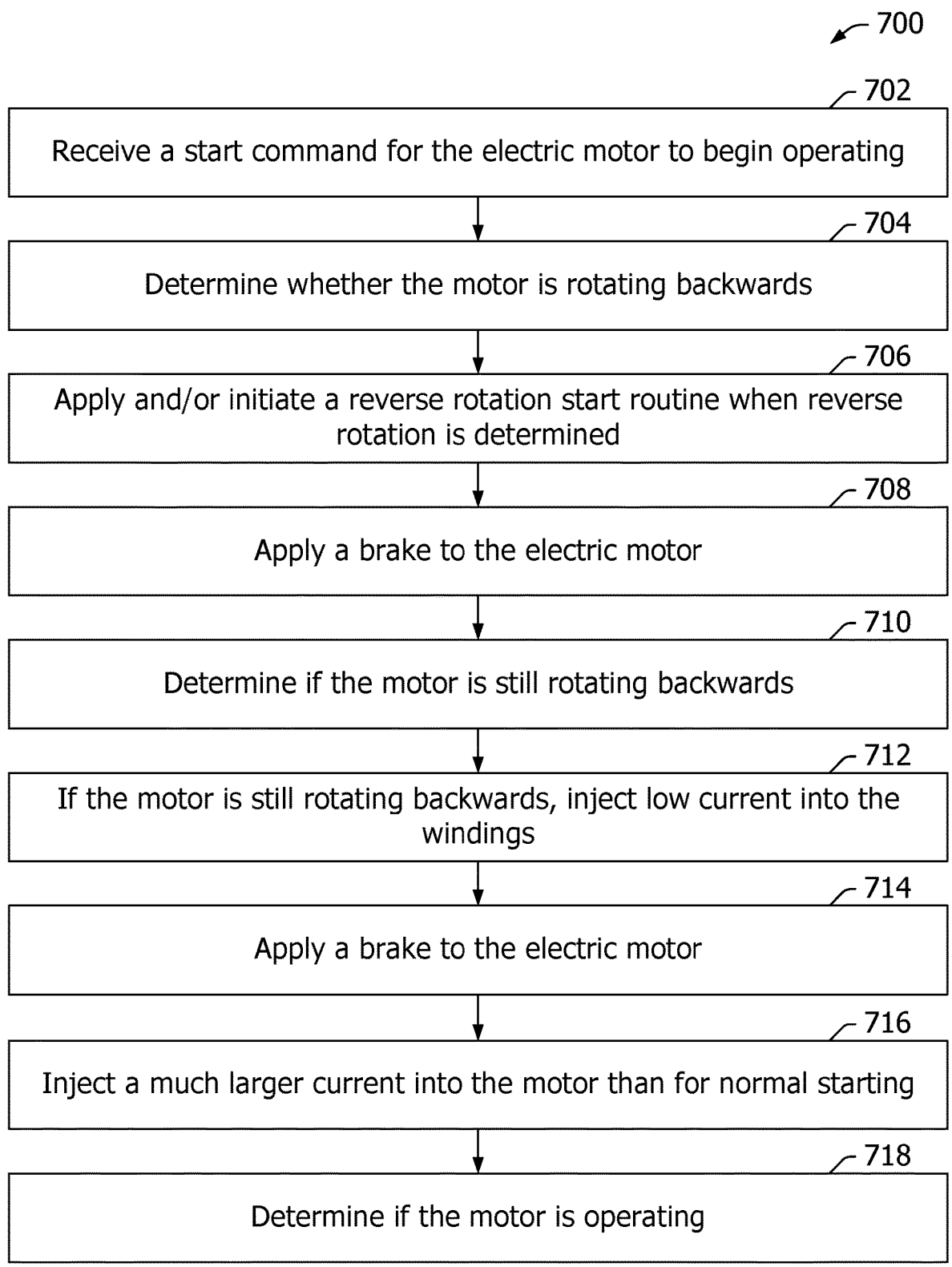
FIG. 7 is a flowchart of an exemplary method of starting the electric motor shown in FIG. 2.

FIG. 7 is a flowchart of an exemplary method 700 of starting electric motor 202 (shown in FIG. 2). Method 700 is similar to method 600 (shown in FIG. 6), but further includes use of motor 202 as a brake to create a known stop prior to starting against back pressure/wind.

In the exemplary embodiment, motor 202 and/or motor controller 200 receives 702 a start command for motor 202 to begin operating. In one embodiment, the start command is received from a controller of an evaporator unit (not shown). Alternatively, the start command may be sent from any system and/or location that facilitates starting an electric motor as described herein. In the exemplary embodiment, after receiving 702 the start command, controller 200 determines 704 if motor 202 is rotating backwards using known techniques. More specifically, in the exemplary embodiment, controller 200 initiates a normal start routine by injecting a small, first amount of current into windings 44 (shown in FIG. 1).

When reverse rotation is determined, controller 200 applies and/or initiates 706 a reverse rotation start routine. The reverse rotation start routine includes, after injecting the first amount of current into windings 44, applying a brake 708 to motor 202. In this embodiment, braking 708 is achieved by controller 200 short circuiting windings (e.g. winding stages 44 shown in FIG. 1). In another embodiment, braking 708 is achieved by controller 200 modulating a braking torque. Controller 200 then determines 710 if motor 202 is still operating in a reverse rotation direction. If motor 202 is operating in a reverse rotation direction, controller 200 injects 712 the first amount of current into windings 44 again and applies 714 a brake to motor 202.

In one embodiment, controller 200 waits either a predetermined time period or a predetermined number of forward rotation attempts after injecting 712 the first amount of current to the windings. The predetermined amount of time may be any amount of time that facilitates starting a motor as described herein, including but not limited to 5-30 seconds. The predetermined number of forward rotation attempts may be any number of attempts that facilitates starting a motor as described herein, for example, greater than one.

Controller 200 then injects 716 a much larger, second amount of current into motor 202 than for normal starting to increase the torque of the normal start routine by a predetermined amount or percentage. The second amount of current injected is set to a maximum amount based on the electronic limits of the power module in motor 202. Applying 716 the second amount of current into motor 202 further includes controller 200 accelerating a load coupled to motor 202. Alternately, the amount of current may be increased for each attempt to brake motor 202, which would be easier on the electronics and harder on the equipment it is in. In another embodiment, the reverse rotation start routine utilizes a last known start routine, brakes the motor, and increases the torque for that start routine a predetermined amount or percentage. In yet another embodiment, the reverse rotation start routine brakes rotation of the motor and applies and/or initiates the normal start routine.

In the exemplary embodiment, after the reverse rotation start routine is applied and/or initiated 706, controller 200 determines 718 if motor 202 is operating. If motor 202 is determined to be operating, the motor controller 200 operates motor 202 in a normal operating mode. If motor 202 is determined not to be operating, the process loop continues until operation of motor 202 is determined. By using a brake between each start attempt to try to stop the windmilling prior to starting, the windmilling is brought to a lower speed, so there is less force than when trying to start straight against higher RPMs.

Figure 8:
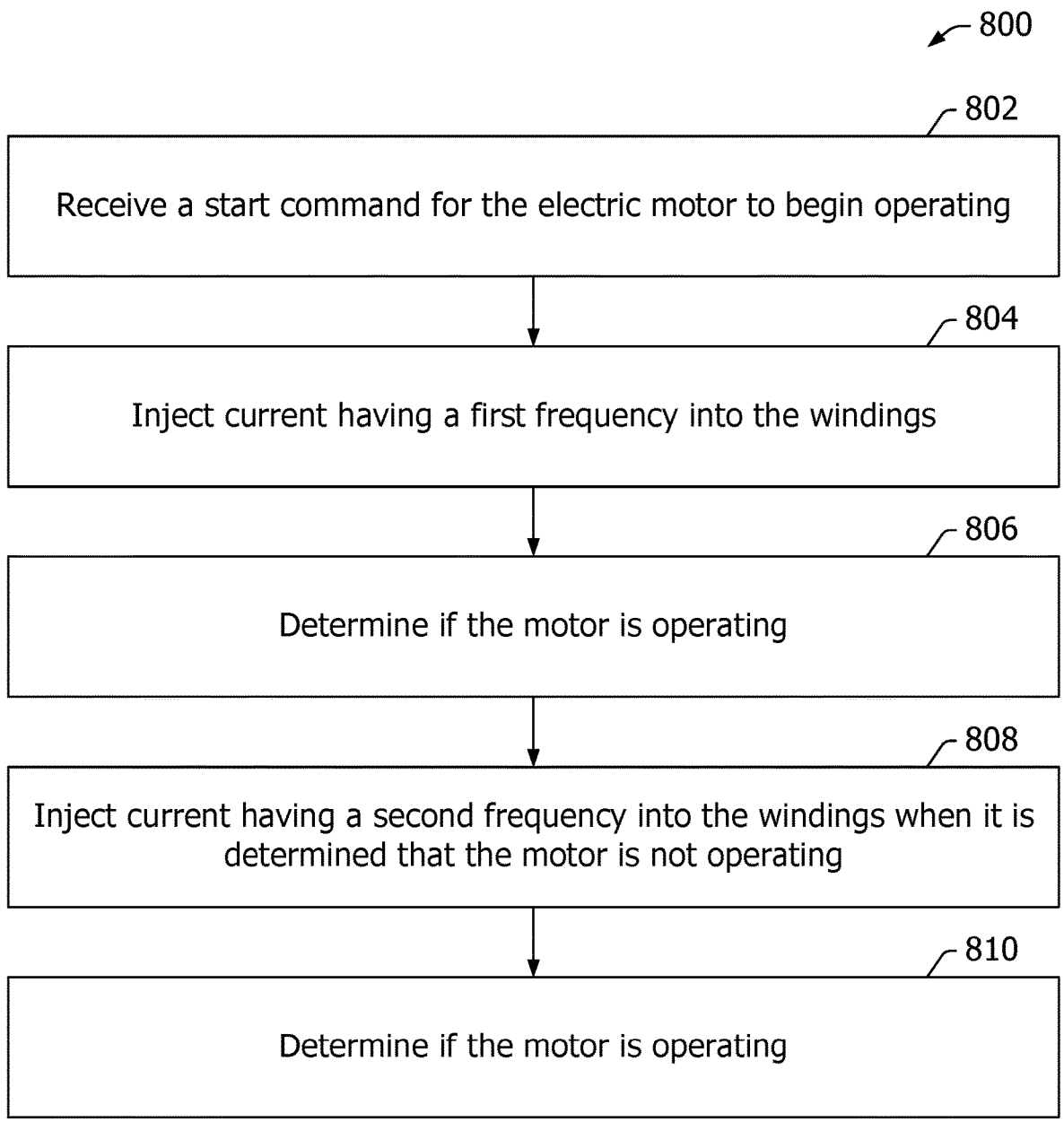
FIG. 8 is a flowchart of an exemplary method of starting the electric motor shown in FIG. 2.

FIG. 8 is flowchart of an exemplary method 800 for starting electric motor 202 (shown in FIG. 2). Method 800 is applied to fracture ice particles that cause a locked rotor condition. Method 800 has the most impact on ice buildup when motor 202 is locked and trying to start.

In the exemplary embodiment, motor 202 and/or controller 200 receives 802 a start command for motor 202 to begin operating. In one embodiment, the start command is received from a controller of an HVAC system. Alternatively, the start command can be sent from any system and/or location that facilitates starting an electric motor as described herein. In the exemplary embodiment, after receiving 802 the start command, controller 200 injects 804 current having a first frequency into the windings.

In the exemplary embodiment, after current having a first frequency is injected 804, controller 200 determines 806 if motor 202 is operating. If motor 202 is determined to be operating, motor controller 200 operates motor 202 in a normal operating mode. If motor 202 is determined not to be operating, controller 200 injects 808 current having a second frequency into the windings. Changing the frequency of the current generates vibrations in motor 202, which breaks up the ice formation. The frequency of the current correlates to vibrations induced in the rotor. By changing the frequency, the rotor shakes faster or slower to break the ice. Based on the frequency of the inverter, controller 200 may form a square wave and range from a few Hz to a few kHz of the switching frequency that prevents ice buildup.

In the exemplary embodiment, after current having a second frequency is injected 808, controller 200 determines 810 if motor 202 is operating. If motor 202 is determined to be operating, motor controller 200 operates motor 202 in a normal operating mode. If motor 202 is determined not to be operating, the process loop continues until operation of motor 202 is determined.

In the exemplary embodiment, injecting current having the first and/or second frequency may include sweeping a range of frequencies, applying frequency patterns, and/or executing an algorithm that applies a frequency and measures relative motion in a closed loop fashion.

The embodiments described herein provide systems and methods for starting an electric motor that may be operating in a reverse rotation. The embodiments facilitate overcoming or preventing no-start conditions and extend product life of electric motors used in extreme cold, condensation/humidity, and back pressure/windmill environments. The systems and methods described herein enable a motor to prevent motor lock up due to ice formation in its air gaps and to prevent condensation/rust formation within the motor. The systems and methods described herein further enable a motor to start during windmilling at both low and high RPMs as well as when there is an uneven formation of ice on an unmoving fan. The embodiments described herein also enable a controller to detect reverse or windmilling rotation without the use of position sensors, which reduces cost of production and increases reliability of the systems.

Exemplary embodiments of the control system and methods of controlling an electric motor are described above in detail. The control system and methods are not limited to the specific embodiments described herein, but rather, components of the control system and/or the motor and/or steps of the method may be utilized independently and separately from other components and/or steps described herein. For example, the control system and methods may also be used in combination with other power systems and methods, and are not limited to practice with only the HVAC system as described herein. Rather, the exemplary embodiments can be implemented and utilized in connection with many other system applications or other support.

A technical effect of the system described herein includes at least one of: a) transmitting, by the processor, a no-spin signal commanding the electric motor not to spin; b) receiving, by the processor, temperature information associated with a temperature of the electric motor; c) comparing, by the processor, the temperature information to a predetermined threshold temperature to determine whether the temperature is at a sufficient level to prevent icing; and d) adjusting, by the processor, current applied to the electric motor when the temperature information is below the predetermined threshold.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller coupled to an electric motor and configured to:
   transmit a no-spin signal commanding the electric motor not to spin;
   continuously apply voltage to the electric motor while the electric motor is not spinning in response to the no-spin signal;
   receive temperature information associated with a temperature of the electric motor;
   compare the temperature information to a predetermined threshold temperature to determine whether the temperature is at a sufficient level to prevent icing; and
   when the temperature information is below the predetermined threshold, increase induced current within the electric motor and maintain the temperature of the electric motor at the sufficient level to prevent icing, by adjusting the voltage applied thereto while the electric motor is not spinning in response to the no-spin signal.

2. The motor controller of claim 1, wherein to receive temperature information, said motor controller is further configured to at least one of receive temperature information from a temperature sensor coupled to the electric motor or generate a temperature estimation.

3. The motor controller of claim 1, wherein to adjust the voltage applied to the electric motor, said motor controller is further configured to determine an amplitude of the current to apply to the electric motor based on at least one of a minimum external ambient temperature needed to be overcome, a target internal ambient temperature, or a unit size of the electric motor.

4. The motor controller of claim 1, further configured to apply current to only one phase of a plurality of phases of motor windings associated with the electric motor.

5. The motor controller of claim 1, further configured to transmit the no-spin signal in response to receiving a stop signal.

6. A motor controller coupled to an electric motor and configured to:
   transmit a no-spin signal commanding the electric motor not to spin;

continuously apply voltage to the electric motor while the electric motor is not spinning in response to the no-spin signal;
receive temperature information associated with a temperature of the electric motor;
compare the temperature information to a predetermined threshold temperature to determine whether the temperature is at a sufficient level to prevent icing; and
when the temperature information is below the predetermined threshold, increase induced current within the electric motor and cause movement in the electric motor to prevent icing, by adjusting the voltage applied to the electric motor while the electric motor is not spinning in response to the no-spin signal.

7. The motor controller of claim 6, wherein to adjust the voltage applied to the electric motor, said motor controller is further configured to induce current in at least two phases of a plurality of phases of motor windings associated with the electric motor.

8. The motor controller of claim 7, wherein to apply the voltage to the at least two phases, said motor controller is further configured to induce current in at least two phases at a twitch frequency to twitch the electric motor to prevent ice formation.

9. The motor controller of claim 8, wherein said motor controller is further configured to determine the twitch frequency based on at least one of a minimum temperature, a condensation level, or a unit size of the electric motor.

10. The motor controller of claim 6, wherein to receive temperature information, said motor controller is further configured to receive temperature information from a temperature sensor coupled to the electric motor.

11. The motor controller of claim 6, wherein to receive temperature information, said motor controller is further configured to generate a temperature estimation.

* * * * *